United States Patent
Xu

(10) Patent No.: US 12,468,903 B2
(45) Date of Patent: Nov. 11, 2025

(54) CONTENT DISPLAY METHOD AND APPARATUS, STORAGE MEDIUM, AND ELECTRONIC DEVICE

(71) Applicant: GUANGDONG OPPO MOBILE TELECOMMUNICATIONS CORP., LTD., Dongguan (CN)

(72) Inventor: Ruoyu Xu, Dongguan (CN)

(73) Assignee: GUANGDONG OPPO MOBILE TELECOMMUNICATIONS CORP., LTD., Guangdong (CN)

( * ) Notice: Subject to any disclaimer, the term of this patent is extended or adjusted under 35 U.S.C. 154(b) by 223 days.

(21) Appl. No.: 18/235,150

(22) Filed: Aug. 17, 2023

(65) Prior Publication Data
US 2023/0394249 A1    Dec. 7, 2023

Related U.S. Application Data

(63) Continuation of application No. PCT/CN2022/071852, filed on Jan. 13, 2022.

(30) Foreign Application Priority Data

Mar. 10, 2021   (CN) .......................... 202110260443.4

(51) Int. Cl.
*G06F 40/58*     (2020.01)
*G06F 3/01*     (2006.01)
(Continued)

(52) U.S. Cl.
CPC .............. *G06F 40/58* (2020.01); *G06F 3/013* (2013.01); *G06F 3/0485* (2013.01);
(Continued)

(58) Field of Classification Search
CPC ........ G06F 40/58; G06F 3/013; G06F 3/0485; G06F 3/0488; G06V 30/1444; G06V 30/147
See application file for complete search history.

(56) References Cited

U.S. PATENT DOCUMENTS

| | | | |
|---|---|---|---|
| 2011/0095993 A1* | 4/2011 | Zuverink | G06F 3/0488 |
| | | | 345/173 |
| 2013/0346060 A1 | 12/2013 | Shin et al. | |

(Continued)

FOREIGN PATENT DOCUMENTS

| | | | | |
|---|---|---|---|---|
| CN | 104765727 A | | 7/2015 | |
| CN | 105074639 A | * | 11/2015 | ........... G06F 3/0481 |

(Continued)

OTHER PUBLICATIONS

International Search Report and Written Opinion dated Apr. 13, 2022 in International Application No. PCT/CN2022/071852. English translation attached.

(Continued)

*Primary Examiner* — Mohammad K Islam
(74) *Attorney, Agent, or Firm* — Sheppard, Mullin, Richter & Hampton LLP

(57) ABSTRACT

Provided is a content display method and apparatus, a storage medium, and an electronic device. The method includes: obtaining a screen state of the electronic device; determining a first to-be-translated content in a display interface when the screen state is a non-touch state; translating the first to-be-translated content to obtain a first translation content, and displaying the first translation content; and stopping displaying the first translation content when the screen state is switched to a touched state.

20 Claims, 10 Drawing Sheets

(51) Int. Cl.
  *G06F 3/0485* (2022.01)
  *G06F 3/0488* (2022.01)
  *G06V 30/14* (2022.01)
  *G06V 30/146* (2022.01)
(52) U.S. Cl.
  CPC ........ *G06F 3/0488* (2013.01); *G06V 30/1444* (2022.01); *G06V 30/147* (2022.01)

(56) References Cited

U.S. PATENT DOCUMENTS

| | | | |
|---|---|---|---|
| 2014/0081620 A1 | 3/2014 | Solntseva | |
| 2014/0222413 A1* | 8/2014 | Rossmann | G06F 3/0488 704/3 |
| 2015/0128037 A1 | 5/2015 | Lee et al. | |
| 2018/0330732 A1* | 11/2018 | Dasgupta | G06F 3/0484 |
| 2025/0148221 A1* | 5/2025 | Lee | G06F 40/106 |

FOREIGN PATENT DOCUMENTS

| | | | | |
|---|---|---|---|---|
| CN | 105468586 A | * | 4/2016 | |
| CN | 106919558 A | | 7/2017 | |
| CN | 110442879 A | * | 11/2019 | G06F 3/0481 |
| CN | 110781688 A | | 2/2020 | |
| CN | 111680521 A | | 9/2020 | |
| CN | 112183121 A | * | 1/2021 | G06F 3/0483 |
| CN | 110928468 B | * | 6/2021 | G06F 16/168 |
| CN | 112905093 A | * | 6/2021 | G06F 3/013 |
| CN | 112183121 B | * | 2/2022 | G06F 3/0483 |
| CN | 114503116 A | * | 5/2022 | G06F 40/42 |
| CN | 110633062 B | * | 11/2023 | G06F 3/0488 |
| EP | 3944129 A1 | * | 1/2022 | G06F 3/0481 |
| JP | 2022547892 A | * | 11/2022 | G06F 3/0488 |
| KR | 20130143320 A | * | 12/2012 | G06F 40/58 |
| WO | WO-2022195360 A1 | * | 9/2022 | G06F 3/04842 |

OTHER PUBLICATIONS

First Office Action from corresponding Chinese Application No. 202110260443.4, dated Jan. 29, 2022. English translation attached.
The Second Office Action from corresponding Chinese Application No. 202110260443.4, dated Jul. 13, 2022. English translation attached.
The Grant Notice from corresponding Chinese Application No. 202110260443.4, dated Sep. 21, 2022. English translation attached.
Extended European Search Report dated Jul. 24, 2024 received in European Patent Application No. EP22766072.7.

\* cited by examiner

CONTENT DISPLAY METHOD AND APPARATUS, STORAGE MEDIUM, AND ELECTRONIC DEVICE

CROSS-REFERENCE TO RELATED APPLICATIONS

The present application is a continuation of International Application No. PCT/CN2022/071852 filed on Jan. 13, 2022, which claims priorities to Chinese Patent Application No. 202110260443.4 filed on Mar. 10, 2021 and entitled "CONTENT DISPLAY METHOD AND APPARATUS, STORAGE MEDIUM, AND ELECTRONIC DEVICE", the entire disclosure of which is incorporated herein by reference.

FIELD

The present disclosure relates to the technical field of data processing, and more particularly, to a content display method and apparatus, a storage medium, and an electronic device.

BACKGROUND

At present, an electronic device like a smartphone and a tablet computer may perform content translation by installing a translation application or browsing a translation website. However, for example, a user needs to first start the translation application or open the translation website on the electronic device, and copy a content needing to be translated into a translation box of the translation application or the translation website for viewing a translation result. Moreover, when the user needs to view an original content, the user needs to return to an original content display interface for viewing.

SUMMARY

The present disclosure provides a content display method, a storage medium, and an electronic device.

In a first aspect, the present disclosure provides a content display method applied in an electronic device. The content display method includes: obtaining a screen state of the electronic device; determining a first to-be-translated content in a display interface when the screen state is a non-touch state; translating the first to-be-translated content to obtain a first translation content, and displaying the first translation content; and stopping displaying the first translation content when the screen state is switched to a touched state.

In a second aspect, the present disclosure provides a storage medium. The storage medium has a computer program stored thereon. The computer program, when loaded by a processor of an electronic device, performs any of the content display methods according to the present disclosure.

In a third aspect, the present disclosure further provides an electronic device. The electronic device includes a processor and a memory storing a computer program. The processor, when loading the computer program, performs any of the content display methods according to the present disclosure.

BRIEF DESCRIPTION OF THE DRAWINGS

In order to clearly explain technical solutions of embodiments of the present disclosure, drawings used in the description of the embodiments are briefly described below. Obviously, the drawings as described below are merely some embodiments of the present disclosure. Based on these drawings, other drawings can be obtained by those skilled in the art without creative effort.

DETAILED DESCRIPTION

Figure 1:
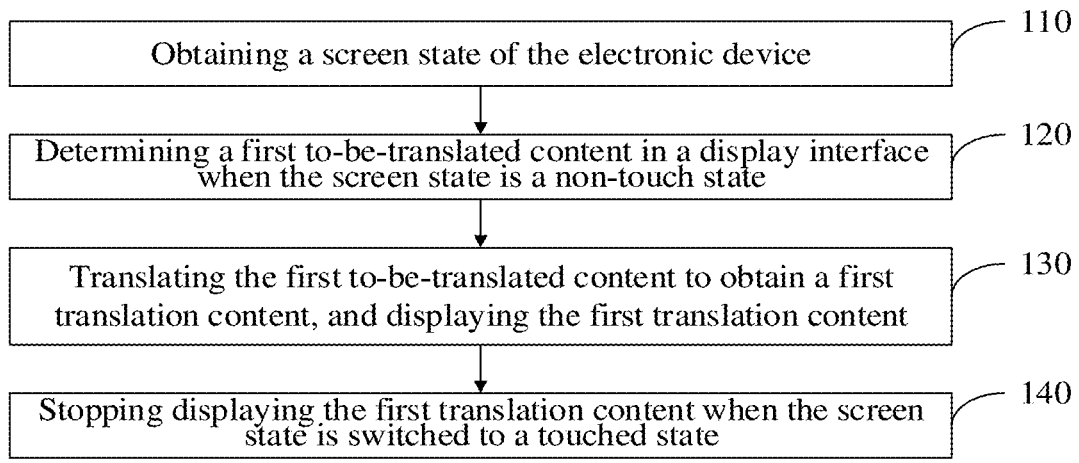
FIG. 1 is a flowchart illustrating a content display method according to an embodiment of the present disclosure.

It should be noted that terms "first", "second" and "third" in the present disclosure are used to distinguish different objects, rather than to describe a specific sequence. In addition, terms "including", "comprising" and "having" and any variations thereof indicate non-exclusive inclusions. For example, a process, a method, a system, a product, or a device that includes a series of actions or modules is not necessarily limited to those clearly listed actions or modules. However, some embodiments may further include other actions or modules that are not clearly listed or may further include other actions or modules that are inherent to the process, the method, the product, or the device.

References herein to "embodiments" mean that a particular feature, structure, or characteristic described in connection with the embodiments may be included in at least one embodiment of the present disclosure. The term appearing at various places of the specification does not necessarily refer to the same embodiment, nor is it a separate or alternative embodiment that is mutually exclusive with other embodiments. It should be understood, both explicitly and implicitly, by those skilled in the art that the embodiments described herein may be combined with other embodiments.

At present, an electronic device such as a smartphone or a tablet computer may perform content translation by installing a translation application or browsing a translation website. However, for example, a user needs to start the translation application or open the translation website on the electronic device, and copy a content needing to be translated into a translation box of the translation application or the translation website for viewing a translation result. Moreover, when the user needs to view an original content, the user needs to return to an original content display interface for viewing. In the related art, ease of use of the electronic device's translation function is poor.

Embodiments of the present disclosure provide a content display method and apparatus, a storage medium, and an electronic device. The content display method may be executed by a content display apparatus according to the embodiments of the present disclosure, or an electronic device integrated with the content display apparatus. The content display apparatus can be implemented in hardware or software. The electronic device may be a device configured with a processor and having a data processing capability such as a smartphone, a tablet computer, a handheld computer, or a laptop computer.

According to the embodiments of the present disclosure, provided is a content display method applied in an electronic device. The content display method includes: obtaining a screen state of the electronic device; determining a first to-be-translated content in a display interface when the screen state is a non-touch state; translating the first to-be-translated content to obtain a first translation content, and displaying the first translation content; and stopping displaying the first translation content when the screen state is switched to a touched state.

Optionally, in an embodiment, the operation of determining the first to-be-translated content in the display interface when the screen state is the non-touch state includes: determining, when the screen state is the non-touch state and a page switch occurs on the display interface, the first to-be-translated content from a page content after the switch.

Optionally, in an embodiment, the operation of determining the first to-be-translated content in the display interface when the screen state is the non-touch state includes: determining, when the screen state is the non-touch state and a page change occurs on the display interface, the first to-be-translated content from a page content after the change.

Optionally, in an embodiment, the page change includes at least one of a size change, a content change, and a sliding change of the page.

Optionally, in an embodiment, the content display method further includes, subsequent to stopping displaying the first translation content: obtaining a touch operation in the touched state; and when the touch operation is a sliding operation, sliding and displaying, on the display interface in response to the sliding operation, a page content of a page where the first to-be-translated content is located.

Optionally, in an embodiment, the content display method further includes, subsequent to sliding and displaying, on the display interface, the page content of the page where the first to-be-translated content is located: determining a second to-be-translated content in the display interface when the screen state is switched to the non-touch state, wherein the second to-be-translated content is a to-be-translated content in a page content after sliding the page where the first to-be-translated content is located; and translating the second to-be-translated content to obtain a second translation content, and displaying the second translation content.

Optionally, in an embodiment, the operation of translating the second to-be-translated content to obtain the second translation content includes: obtaining a difference content between the second to-be-translated content and the first to-be-translated content; translating the difference content to obtain a third translation content, and obtaining a fourth translation content corresponding to a same content between the second to-be-translated content and the first to-be-translated content from the first translation content; and obtaining the second translation content based on the third translation content and the fourth translation content.

Optionally, in an embodiment, the operation of determining the first to-be-translated content in the display interface includes: capturing a page content currently displayed on the display interface to obtain a screenshot image; performing text recognition on the screenshot image to obtain a text recognition content; and determining the first to-be-translated content from the text recognition content.

Optionally, in an embodiment, the operation of displaying the first translation content includes: rendering the first translation content to a position corresponding to the first to-be-translated content in the screenshot image to obtain a translation image; and displaying the translation image in the display interface.

Optionally, in an embodiment, the operation of rendering the first translation content to the position corresponding to the first to-be-translated content in the screenshot image includes: obtaining a display parameter of the first to-be-translated content, and determining a target display parameter for the first translation content based on the display parameter; and rendering the first translation content to the position corresponding to the first to-be-translated content in the screenshot image based on the target display parameter.

Optionally, in an embodiment, the content display method further includes, prior to capturing the page content currently displayed on the display interface to obtain the screenshot image: identifying whether the page content currently displayed on the display interface is a text content; and capturing the page content currently displayed on the display interface to obtain the screenshot image when the page content currently displayed on the display interface is not the text content.

Optionally, in an embodiment, the content display method further includes, subsequent to identifying whether the page content currently displayed on the display interface is the text content: determining the first to-be-translated content directly from the currently displayed page content when the page content currently displayed on the display interface is the text content.

Optionally, in an embodiment, the operation of determining the first to-be-translated content in the display interface includes: determining a to-be-translated region of a screen; and determining the first to-be-translated content from the to-be-translated region.

Optionally, in an embodiment, the operation of determining the to-be-translated region of the screen includes: obtaining a predetermined translation region for the screen, and determining the predetermined translation region as the to-be-translated region.

Optionally, in an embodiment, the operation of determining the first to-be-translated content from the to-be-translated region includes: receiving a region adjustment operation for the to-be-translated region; adjusting the to-be-translated region based on the region adjustment operation to obtain an adjusted region; and determining the first to-be-translated content from the adjusted region.

Optionally, in an embodiment, the content display method further includes, subsequent to determining the to-be-translated region of the screen: identifying a gaze region of a user on the screen when determination of the to-be-translated region fails; and determining the to-be-translated region based on the gaze region.

Optionally, in an embodiment, the operation of obtaining the screen state of the electronic device includes: monitoring an action_down event, an action_move event, or an action_up event for the screen; and determining that the screen state is the touched state when the action_move event or the action_down event is monitored; or determining that the screen state is the non-touch state when the action_up event is monitored.

FIG. 1 is a flowchart illustrating a content display method according to an embodiment of the present disclosure. The content display method is applied in an electronic device according to the present disclosure. As illustrated in FIG. 1, a process of the content display method according to the embodiment of the present disclosure may include the following operations.

At 110, a screen state of the electronic device is obtained.

Here, the screen state includes the touched state and the non-touch state. For example, the touched state is a state when a user touches a screen of the electronic device by using a body part like a finger or a touch device like a stylus pen. The non-touch state is a state when the screen of the electronic device is not touched by the body part of the user or the touch device.

For example, when the translation function is started, the electronic device may obtain its own screen state, and perform translation processing based on the obtained screen state.

Figure 2:
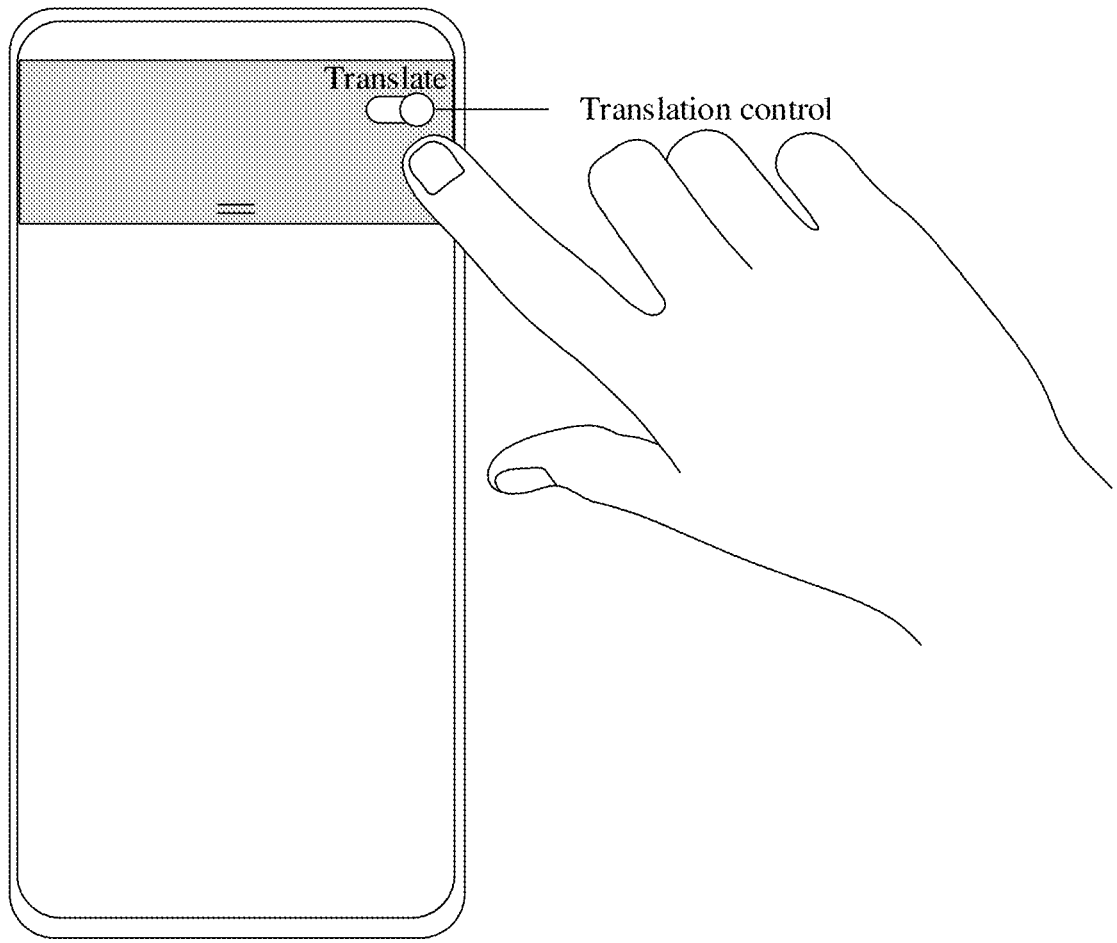
FIG. 2 is an example diagram of enabling a translation function of an electronic device by a user through a translation control according to an embodiment of the present disclosure.

Exemplarily, referring to FIG. 2, the electronic device provides a translation control for starting and closing the translation function. As illustrated in FIG. 2, the translation control may be disposed in a drop-down box of the electronic device or disposed in a sidebar and other function menus of the electronic device, which may be specifically configured by a person skilled in the art as actually needed.

At 120, a first to-be-translated content is determined in a display interface when the screen state is a non-touch state.

As above, two screen states are defined in the embodiments of the present disclosure, which are the touched state and the non-touch state, respectively.

Here, when the screen state is obtained as the non-touch state, the electronic device determines that a page content displayed on a display interface of the screen needs to be translated. In this case, the electronic device determines the content needing to be translated from the page content of the display interface according to a configured content determination strategy. The determined content needing to be translated is referred to as the first to-be-translated content.

It should be noted that translation means expressing the meaning of speech or writing in a different language (also means changing expression between a dialect and a common national language, between dialects, and between an ancient language and a modern language); or expressing a symbol or numerical code representing speech or writing in the speech or writing. Correspondingly, in the embodiments of the present disclosure, the first to-be-translated content may be a writing content/characters or other contents capable of characterizing a language like a symbol or a numerical code.

In addition, in the embodiments of the present disclosure, the configuration for the content determination strategy is not specifically limited, and may be set by a person skilled in the art as actually needed. For example, the configuration for the content determination strategy may include: determining characters of a predetermined linguistic type as the first to-be-translated content.

Here, the predetermined linguistic type may be constant or dynamic. For example, the predetermined linguistic type may be configured by default to English or Chinese, etc. by the electronic device. Moreover, the predetermined linguistic type may also be dynamically configured by the electronic device based on the user's viewing of the page content.

At 130, the first to-be-translated content is translated to obtain a first translation content, and the first translation content is displayed.

After the first to-be-translated content is determined, the electronic device further translates the first to-be-translated content based on a configured translation strategy. The translated content is referred to as the first translation content. The translation strategy is used to describe how to translate the first to-be-translated content, which may be specifically configured by a person skilled in the art as actually needed.

As above, after the first translation content is obtained by translating the first to-be-translated content, the electronic device further displays the first translation content for user's view. It should be noted that a display mode of the first translation content is not specifically limited in the embodiments of the present disclosure and may be configured by a person skilled in the art as actually needed. Exemplarily, the first translation content may be displayed covering the first to-be-translated content. For example, a translation image with the same size as the display interface may be generated by rendering based on the first translation content and be displayed in the display interface, enabling the translation image to cover an original page content. In addition, the first translation content and the first to-be-translated content may be displayed simultaneously.

Figure 3:
FIG. 3 is an example diagram of an electronic device performing translation and display according to an embodiment of the present disclosure.

For example, referring to FIG. 3, the electronic device determines an English poem I Never Saw A Moor displayed in its display interface as the first to-be-translated content, translates it from English to Chinese to obtain the first translation content as corresponding Chinese text, and displays this Chinese text (i.e. the first translation content) in the display interface. As illustrated in FIG. 3, it can be seen that both English characters in the image and in text form are translated into the corresponding Chinese characters for display.

Figure 4:
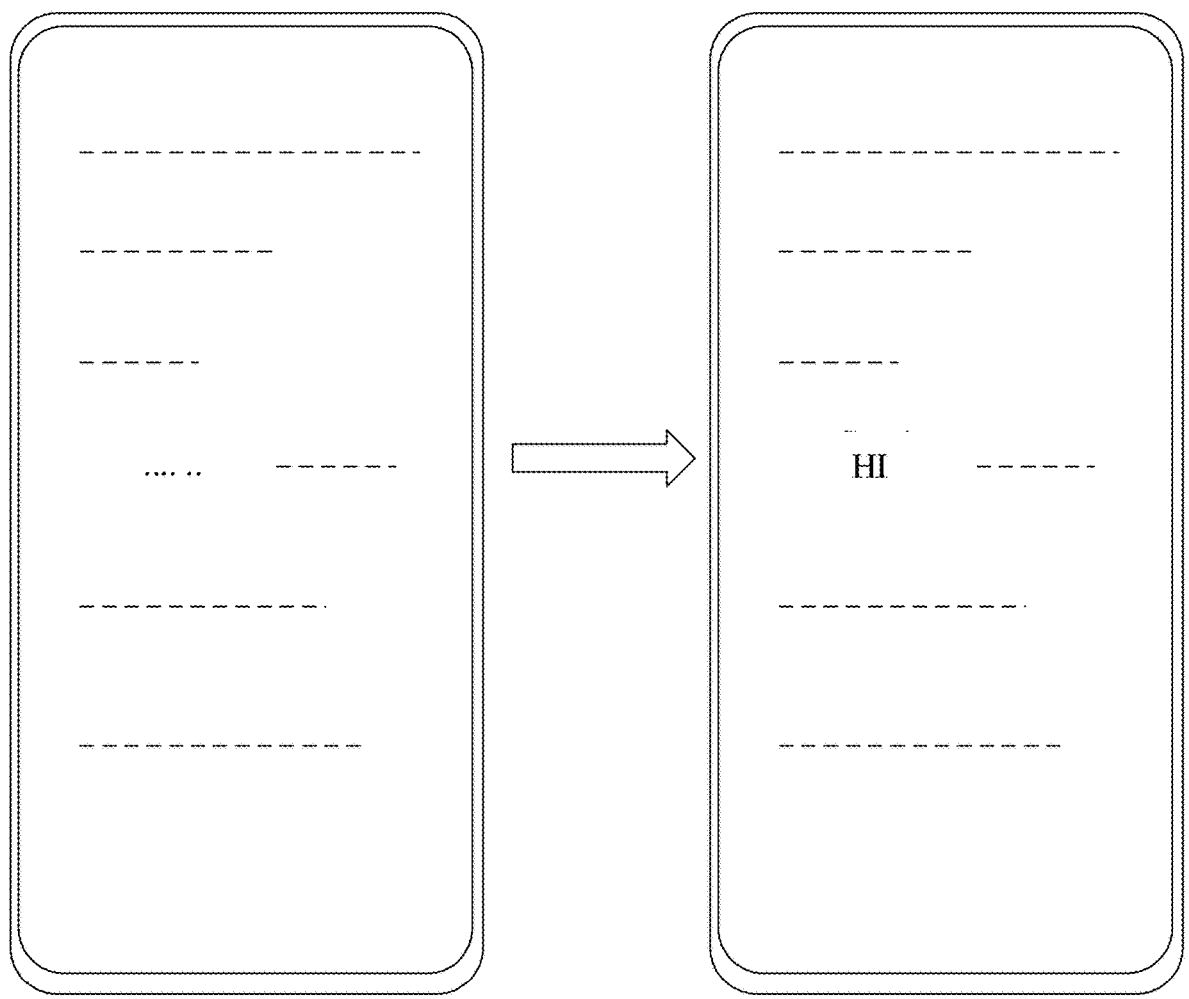
FIG. 4 is another example diagram of an electronic device performing translation and display according to an embodiment of the present disclosure.

For another example, referring to FIG. 4, a passage of Morse code in the display interface " . . . " is determined as the first to-be-translated content. The electronic device translates it cryptographically to obtain the first translation content including corresponding English text "HI".

At 140, display of the first translation content is stopped when the screen state is switched to a touched state.

In an embodiment of the present disclosure, during the display of the first translation content, the electronic device also monitors a change in the screen state in real time. In response to monitoring that the screen is switched to the touched state from the non-touch state, the electronic device stops displaying the first translation content. When the electronic device displays the first translation content in a manner of covering the first to-be-translated content, display of the first to-be-translated content is recovered after the first translation content stops displaying. When the electronic device adopts a manner of simultaneously displaying the first to-be-translated content and the first translation content, the electronic device only displays the page content of the page where the first to-be-translated content is located after the first translation content stops displaying.

As can be seen from the above, in the present disclosure, the screen state of the electronic device is obtained, and the first to-be-translated content in the display interface is determined when the screen state is the non-touch state. Then, the first to-be-translated content is translated to obtain the first translation content, and the first translation content is displayed. Moreover, the display of the first translation content is stopped when the screen state is switched to the touched state. As such, the user may instruct the electronic device to perform a switching display of original text and translation simply by touching and not touching the screen of the electronic device, thereby reducing complexity of operating the translation function of the electronic device and effectively improving the ease of use of the electronic device's translation function.

Optionally, in an embodiment, whether the user has a translation requirement is predicted. In response to that the user has the translation requirement, the translation function is started.

According to the embodiment of the present disclosure, an optional translation function starting strategy is further provided.

Here, the electronic device predicts whether the user has the translation requirement based on a configured prediction strategy. In response to that the user has the translation requirement, the translation function is started. The configuration of the prediction strategy is not limited specifically herein and may be configured by a person skilled in the art as actually needed.

Exemplarily, the electronic device measures viewing speeds of the user viewing a predetermined amount of text in different languages (either the text itself, or symbols or numerical codes representing the text, etc.) in advance and calculates an average of a plurality of viewing speeds. The average viewing speed is used as a predetermined viewing speed for determining whether the user has the translation requirement. For example, the prediction strategy is configured as: determining that the user has the translation requirement in response to identifying that a real-time viewing speed of the user viewing a text content of the predetermined amount does not reach the above-mentioned predetermined viewing speed; and determining that the user has no translation requirement in response to identifying that the real-time viewing speed of the user viewing the text content of the predetermined amount reaches the above-mentioned predetermined viewing speed.

Optionally, in an embodiment, the content display method provided by the present disclosure further includes: configuring a linguistic type corresponding to a maximum viewing speed among the plurality of measured viewing speeds as a translation type, and configuring a linguistic type with a viewing speed smaller than the average viewing speed as a predetermined linguistic type needing to be translated.

Correspondingly, when performing translation, the electronic device performs translation based on the translation type and the predetermined linguistic type as described above.

For example, the electronic device determines characters/symbols of a predetermined linguistic type in the screen as the first to-be-translated content, and translates the first to-be-translated content into the first translation content based on the translation type as described above.

Optionally, in an embodiment, the operation of determining the first to-be-translated content in the display interface when the screen state is the non-touch state includes: determining, when the screen state is the non-touch state and a page switch occurs on the display interface, the first to-be-translated content from a page content after the switch.

Understandably, in practice, a page of the electronic device generally provides a control for page switching, like a "forward" control, a "backward" control, a "previous-page" control, and a "next-page" control. After a page switch control is touched by the user (that may be touched directly by the user's finger or indirectly by the user through the touch device like the stylus pen), a new page may take some time to complete loading. If the page content displayed on the display interface is translated as soon as the user ends touching, the page content displayed on the interface may still be in a process of switching or loading. In this case, a content expected to be translated by the user cannot be translated. Therefore, the translated content is incomplete and low in accuracy.

Therefore, in the embodiments of the present disclosure, whether the page switch occurs is monitored in addition to monitoring the touch state of the screen. A monitoring strategy of the page switching may be configured by a person skilled in the art as actually needed based on different systems configured in the electronic device.

Exemplarily, taking Android System as an example, it is possible to monitor whether the page switch occurs by using an "AppSwitchObserver" interface provided by a framework layer of the Android system. Thus, the first to-be-translated content is determined from the switched page content in response to monitoring that the screen state is the non-touch state and the page switch occurs on the display interface.

Figure 5:
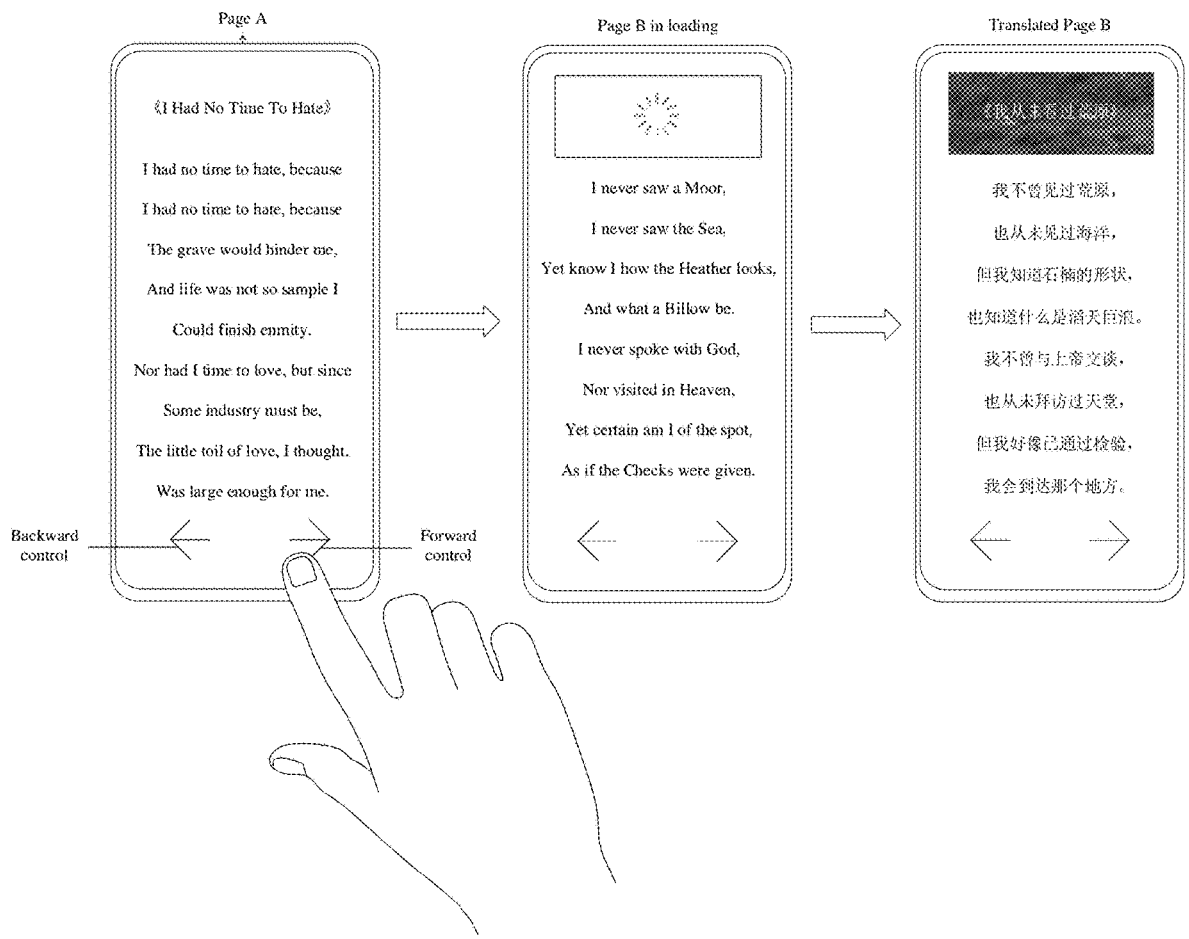
FIG. 5 is an example diagram of a page switch of an electronic device according to an embodiment of the present disclosure.

For example, referring to FIG. 5, the electronic device displays a page A at a moment, and the user moves away from a forward control in the page A after touching it by using his finger. At this time, the electronic device learns that the screen state is the non-touch state by monitoring. In addition, as the forward control in the page A is triggered, and the electronic device jumps to a page B for display. The electronic device determines the first to-be-translated content from the page B for translating after the page B completes loading, instead of translating the page content displayed on the display interface during switching of the page content displayed on the display interface or loading the page B, during switching to the page B from the page A, and during loading the page B. As illustrated in FIG. 5, a content of the page B is the English poem I Never SAW A MOOR. During loading as illustrated in the drawing, a picture in the page B is not yet loaded. At this time, the original English text is displayed. On the other hand, after the loading is completed, the electronic device determines the English poem I Never SAW A MOOR displayed on the page B as the first to-be-translated content (including the title of I Never Saw A Moor in the picture), translates the first to-be-translated content from English to Chinese to obtain the first translation content as the corresponding Chinese text, and displays the obtained first translation content.

Optionally, in an embodiment, the operation of determining the first to-be-translated content in the display interface when the screen state is the non-touch state includes: determining, when the screen state is the non-touch state and a page change occurs on the display interface, the first to-be-translated content from a page content after the change.

Here, the page change includes at least one of a size change, a content change, and a sliding change of the page.

It can be understood that, in practice, in addition to providing the control for the page switch, the page of the electronic device further provides a control or touch operation for controlling the page itself such as a "refresh" control for refreshing the page content, a "maximization" control for maximizing the page, a "restoring-downward" control for restoring the page downwards, a "slider" control for sliding the page, and a sliding operation for sliding the page. When a control that may cause a change of the page itself is touched by the user (that may be touched directly by the user's finger or indirectly by the user through the touch device like the stylus pen) or when the touch operation is performed by the user based on the screen, a new page may take some time to complete loading. For example, when the user's finger leaves the screen after sliding the "slider" control in the page with his finger or performing a screen-based sliding operation for sliding the image, the screen state is the non-touch state, but the page displayed on the display interface continues to slide by inertia. If translation is performed as soon as the user ends touching, the page may still possibly be changing. In this case, the content expected to be translated by the user cannot be translated.

Therefore, in the embodiments of the present disclosure, whether the page switch occurs in addition to monitoring the touch state of the screen. The monitoring strategy for the page change may be configured by a person skilled in the art as actually needed based on the different systems configured in the electronic device.

Exemplarily, taking the Android System as an example, it is possible to monitor whether the page change occurs by using "AccessibilityService" provided by the Android system. Thus, the first to-be-translated content is determined from the changed page content in response to monitoring that the screen state is the non-touch state and the page change occurs on the display interface.

Figure 6:
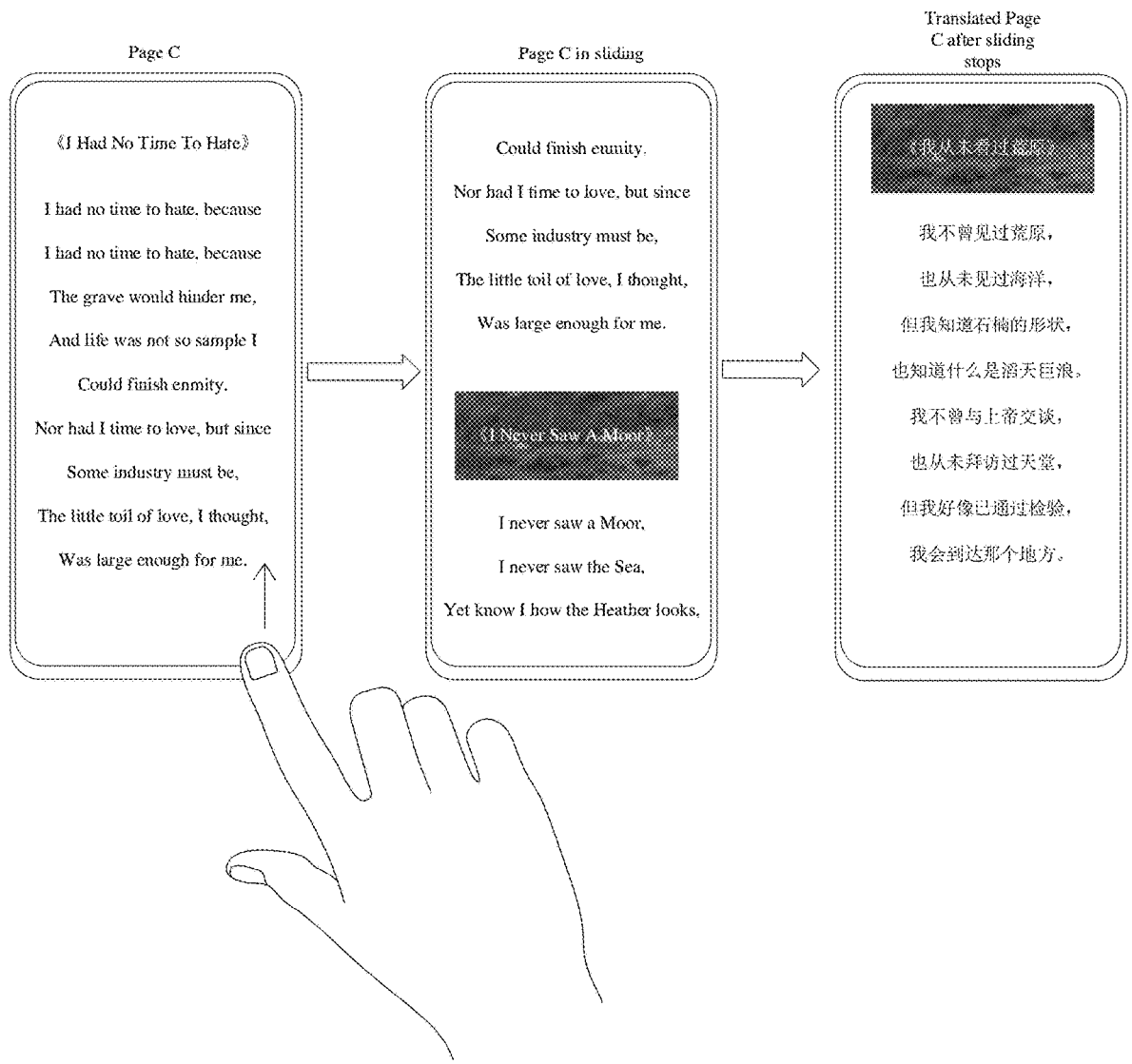
FIG. 6 is an example diagram of a page change of an electronic device according to an embodiment of the present disclosure.

For example, referring to FIG. 6, the electronic device displays a page C at a moment, and the page C includes an English poem I Had No Time To Hate illustrated in the drawing. The English poem I Had No Time To Hate is followed by another English poem I Never Saw A Moor, which is gradually displayed as the user swipes up the page C with a finger. After the slide stops, the electronic device determines the English poem I Never SAW A MOOR displayed on the page C as the first to-be-translated content (including the title of I Never Saw A Moor in the picture), translates it from English to Chinese to obtain the first translation content as the corresponding Chinese text, and displays the obtained first translation content.

Optionally, in an embodiment, the content display method further includes, subsequent to stopping displaying the first translation content: obtaining a touch operation in the touched state; and when the touch operation is a sliding operation, sliding and displaying, on the display interface in response to the obtained sliding operation, a page content of a page where the first to-be-translated content is located.

In the embodiments of the present disclosure, after the display of the first translation content is stopped, the page content may be arbitrarily slid based on the user operation.

As above, in the embodiments of the present disclosure, when the screen state is the touched state, the electronic device further obtains a touch operation in the touched state. The touch operation includes, but is not limited to, the sliding operation and a press operation.

When the obtained touch operation is the pressing operation, the electronic device stops displaying the first translation content. When the electronic device displays the first translation content in the manner of covering the first to-be-translated content, the display of the first to-be-translated content is restored after the first translation content stops displaying. When the electronic device adopts the manner of simultaneously displaying the first to-be-translated content and the first translation content, the electronic device only displays the page content of the page where the first to-be-translated content is located after the first translation content stops displaying.

When the obtained touch operation is the sliding operation, the electronic device stops displaying the first translation content based on sliding information of the sliding operation (when the first to-be-translated content is covered by the first translation content, the electronic device still recovers the display of the first to-be-translated content), and slides and displays, on the display interface, the page content of the page where the first to-be-translated content is located, i.e., an untranslated original text content. The sliding information at least includes a sliding direction and a sliding distance. In addition, the sliding information may also include a sliding speed and the like.

Figure 7:
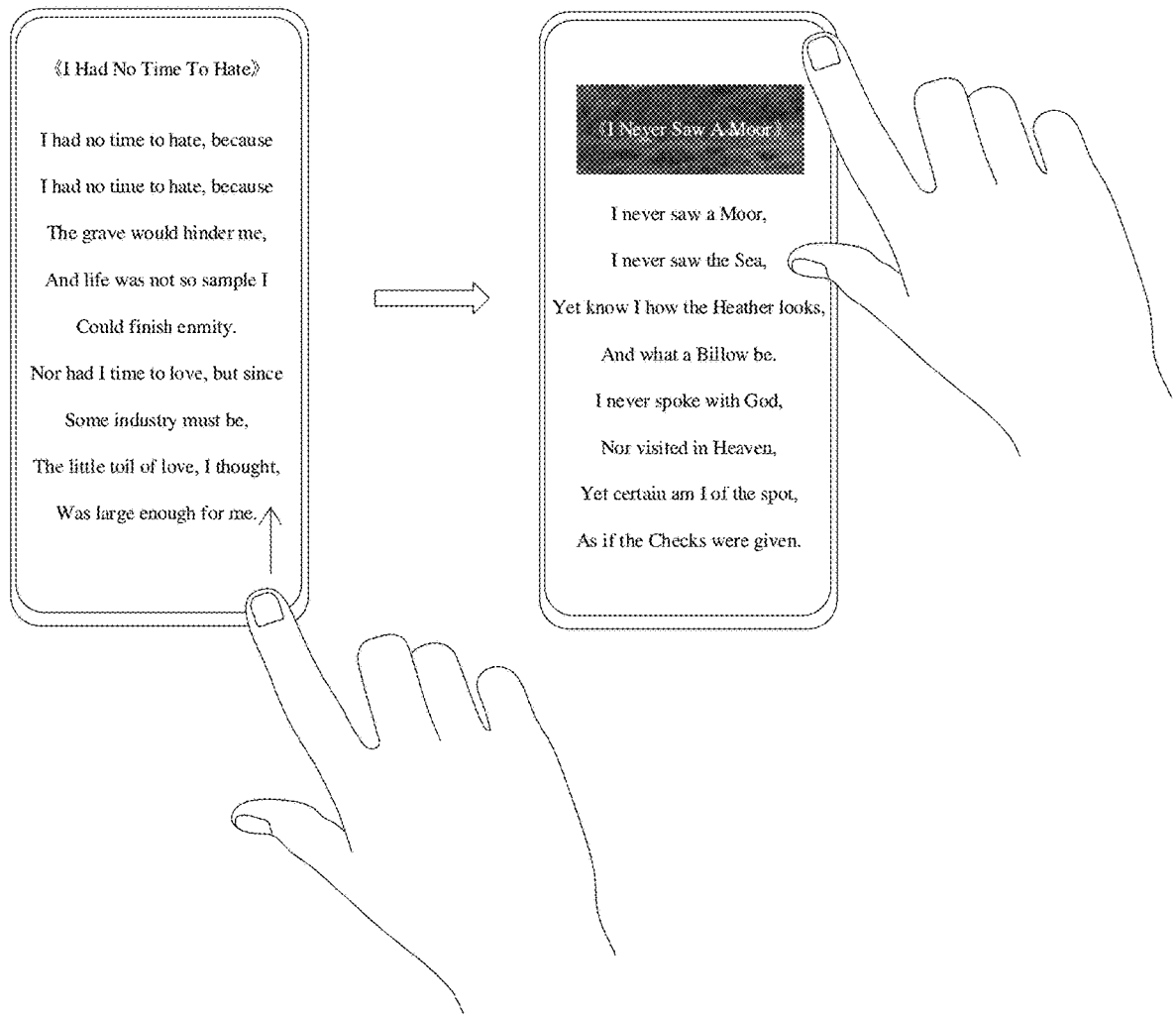
FIG. 7 is another example diagram of a page change of an electronic device according to an embodiment of the present disclosure.

Exemplarily, referring to FIG. 7, the user uses the finger to swipe up the screen of the electronic device. At this time, the electronic device obtains the sliding operation and correspondingly follows the user's finger to slide the page content of the screen upwards.

Optionally, in an embodiment, the content display method further includes, subsequent to sliding and displaying, on the display interface, the page content of the page where the first to-be-translated content is located: determining a second to-be-translated content in the display interface when the screen state is switched to the non-touch state, wherein the second to-be-translated content is a to-be-translated content in a page content after sliding the page where the first to-be-translated content is located; and translating the second to-be-translated content to obtain a second translation content, and displaying the second translation content.

It can be understood that after the electronic device slides and displays the page content based on the sliding operation, the page content before and after sliding may be different, either completely or partially. Therefore, after the response to the sliding operation is completed, the electronic device is triggered again for translation to satisfy user's translation requirements.

Here, when the electronic device monitors that the screen state is switched to the non-touch state again, it is determined that the page content of the screen needs to be translated. In this case, the electronic device determines, based on the configured content determination strategy, the content needing to be translated from the page content after sliding the page where the first to-be-translated content is located. The content needing to be translated is referred to as the second to-be-translated content. The second to-be-translated content may be a text content or other contents like a symbol or a numerical code, capable of characterizing a language.

After the second to-be-translated content is determined, the electronic device further translates the second to-be-translated content according to the configured translation strategy. The translated content is referred to as the second translation content. After obtaining the second translation content by translating the second to-be-translated content, the electronic device further displays the second translation content. A display mode of the second translation content is not specifically limited herein, and may be configured by a person skilled in the art as actually needed. For example, a display mode that is the same as that of the first translation content may be used.

Optionally, in an embodiment, the operation of translating the second to-be-translated content to obtain the second translation content includes: obtaining a difference content between the second to-be-translated content and the first to-be-translated content; translating the difference content to obtain a third translation content, and obtaining a fourth translation content corresponding to a same content between the second to-be-translated content and the first to-be-translated content from the first translation content; and obtaining the second translation content based on the third translation content and the fourth translation content.

In the embodiment of the present disclosure, in order to improve translation efficiency, the electronic device performs incremental translation.

Here, when the second to-be-translated content is translated to obtain the second translation content, the electronic device first compares the second to-be-translated content obtained at this time with the previously obtained first to-be-translated content, so as to obtain the difference content between the second to-be-translated content and the first to-be-translated content. Then, the electronic device further translates the difference content on the basis of the configured translation strategy, and the translated content is referred to as the third translation content. In addition, since the same content between the second to-be-translated content and the first to-be-translated content has been translated during translation of the first to-be-translated content, the electronic device may directly obtain a translation content corresponding to the same content between the second to-be-translated content and the first to-be-translated content from the first translation content, and the translation content is referred to as the fourth translation content. As a result, the electronic device obtains the third translation content as the difference content between the second to-be-translated content and the first to-be-translated content and the fourth translation content as the same content between the second to-be-translated content and the first to-be-translated content, and further obtains the second translation content corresponding to the second to-be-translated content by combining the third translation content and the fourth translation content.

Optionally, in an embodiment, the operation of determining the first to-be-translated content in the display interface includes: capturing a page content currently displayed on the display interface to obtain a screenshot image; performing text recognition on the screenshot image to obtain a text recognition content; and determining the first to-be-translated content from the text recognition content.

According to the embodiment of the present disclosure, an optional determination mode of the first to-be-translated content is further provided.

Here, when determining the first to-be-translated content in the display interface, the electronic device captures the page content currently displayed on the display interface to obtain the screenshot image corresponding to the page content. It can be understood that the screenshot image may include contents such as text, symbols, numerical codes, and pictures.

As above, after the screenshot image corresponding to the page content currently displayed on the display interface is captured, the electronic device performs text recognition on the screenshot image to correspondingly obtain the text recognition content corresponding to the screenshot image. The specific kind of text recognition technology used by the electronic device is not specifically limited herein and may be configured by a person skilled in the art as actually needed. For example, the electronic device may perform text recognition on the screenshot image by using an Optical Character Recognition (OCR) technology, to obtain the text recognition content corresponding to the screenshot image.

It should be noted that the text recognition content includes, but is not limited to, text contents such as text, symbols, and numerical codes.

After the text recognition content is identified, the electronic device may determine the first to-be-translated content from the text recognition content according to the configured content determination strategy.

Optionally, in an embodiment, the operation of displaying the first translation content includes: rendering the first translation content to a position corresponding to the first to-be-translated content in the screenshot image to obtain a translation image; and displaying the translation image in the display interface.

According to the embodiment of the present disclosure, an optional display mode of the translation content is further provided.

Here, when the electronic device displays the first translation content, the first translation content is rendered by the electronic device to the position corresponding to the first to-be-translated content in the screenshot image, i.e., the position where the first to-be-translated content is located to obtain a new image, which is referred to as the translation image. Then, the translation image is displayed by the electronic device in the display interface. In this way, it is possible to achieve a display effect that the first translation content is displayed covering the first to-be-translated content. Further, when the screen state is switched to the touched state, the translation image is stopped from being displayed, thereby stopping displaying the first translation content to recover the page content displayed on the display interface before translation, so that the display of the first to-be-translated content is resumed.

Optionally, in an embodiment, the operation of rendering the first translation content to the position corresponding to the first to-be-translated content in the screenshot image includes: obtaining a display parameter of the first to-be-translated content, and determining a target display parameter for the first translation content based on the display parameter; and rendering the first translation content to the position corresponding to the first to-be-translated content in the screenshot image based on the target display parameter.

According to the embodiment of the present disclosure, in order to improve the display effect of the translation content, the electronic device determines a display parameter for the translation content based on a display parameter of the to-be-translated content.

Here, when rendering the first translation content, the electronic device first obtains the display parameter of the first to-be-translated content. The display parameter includes, but is not limited to, a position, a size, a color, a type, and the like of a display font. After the display parameter of the first to-be-translated content is obtained, the electronic device further determines a display parameter for the first translation content based on the display parameter in accordance with a configured parameter determination strategy. The display parameter is referred to as the target display parameter.

As above, after the target display parameter for the first translation content is determined, the electronic device may render the first translation content to the position corresponding to the first to-be-translated content in the screenshot image based on the target display parameter.

Exemplarily, the parameter determination strategy may be configured to include: directly determining the display parameter of the first to-be-translated content as the target display parameter.

For example, by taking the size of the display font as an example, the electronic device first obtains a font size of the first to-be-translated content, and then renders the first translation content to the position corresponding to the first to-be-translated content in the screenshot image by using the same font size.

Optionally, in an embodiment, the content display method further includes, prior to capturing the page content currently displayed on the display interface to obtain the screenshot image: identifying whether the page content currently displayed on the display interface is a text content; and capturing the page content currently displayed on the display interface to obtain the screenshot image when the page content currently displayed on the display interface is not the text content.

In order to prevent meaningless screenshot operations from prolonging a translation time, in the embodiment of the present disclosure, the page content currently displayed on the display interface is further identified before screen capture.

Here, before capturing the page content currently displayed on the display interface, the electronic device first identifies whether the page content currently displayed on the display interface is the text content. When it is identified that the page content currently displayed on the display interface is not the text content (for example, the page content currently displayed on the display interface is a picture content), the page content currently displayed on the display interface is captured to correspondingly obtain the screenshot image.

Optionally, in an embodiment, the content display method further includes, subsequent to identifying whether the page content currently displayed on the display interface is the text content: determining, when the page content currently displayed on the display interface is the text content, the first to-be-translated content directly from the page content currently displayed on the display interface.

It can be understood that, when it is identified that the page content currently displayed on the display interface is the text content, it is not necessary to capture and then perform text recognition on the text content. At this time, the electronic device may determine the first to-be-translated content directly from the page content currently displayed on the display interface according to the configured content determination strategy.

Optionally, in an embodiment, the operation of determining the first to-be-translated content in the display interface includes: determining a to-be-translated region of a screen; and determining the first to-be-translated content from the to-be-translated region.

In order to enhance flexibility of translation, the electronic device may only translate a partial content displayed on the screen.

Here, the electronic device first determines the to-be-translated region of the screen based on a configured region determination strategy, and then determines the first to-be-translated content from the to-be-translated region. The configuration of the region determination strategy herein is not specifically limited, and may be configured by a person skilled in the art as actually needed. For example, the region determination strategy may be configured as: determining the middle one-third region of the screen as the to-be-translated region.

After the to-be-translated region of the screen is determined, the electronic device further determines the first to-be-translated content from the to-be-translated region. For how to determine the first to-be-translated content from the to-be-translated region, reference can be specifically made to the related disclosure about determining the first to-be-translated content in the screen in the above embodiments, and details will be omitted here.

For example, the electronic device may capture the to-be-translated region, obtain the corresponding screenshot image, and then obtain the text recognition content by performing text recognition on the screenshot image, and further determine the first content to be translated from the text recognition content.

Optionally, in an embodiment, the operation of determining the to-be-translated region of the screen includes: obtaining a predetermined translation region for the screen, and determining the predetermined translation region as the to-be-translated region.

In the embodiment of the present disclosure, the to-be-translated region may be pre-configured.

Here, when the to-be-translated region of the screen is determined, the electronic device may obtain the predetermined translation region for the screen, and determine the predetermined translation region as the to-be-translated region.

It should be noted that in the embodiments of the present disclosure, the configuration of the predetermined translation region is not specifically limited, and may be configured by the electronic device as a default one (configured by a person skilled in the art according to experience) or configured by the electronic device based on a user input.

Optionally, in an embodiment, the operation of determining the first to-be-translated content from the to-be-translated region includes: receiving a region adjustment operation for the to-be-translated region; adjusting the to-be-translated region based on the region adjustment operation to obtain an adjusted region; and determining the first to-be-translated content from the adjusted region.

In order to further improve translation flexibility of the electronic device, in the embodiment of the present disclosure, the user is provided with a capability of adjusting the to-be-translated region.

Here, after determining the to-be-translated region, the electronic device may receive the region adjustment operation for the to-be-translated region. The region adjustment operation is used to indicate an adjustment for at least one of a position, a size, and a shape of the to-be-translated region.

When the region adjustment operation for the to-be-translated region is received, the electronic device adjusts the at least one of the position, the size, and the shape of the to-be-translated region according to the region adjustment operation, the adjusted to-be-translated region is referred to as the adjusted region, and the adjusted region is determined as the to-be-translated region.

Figure 8:
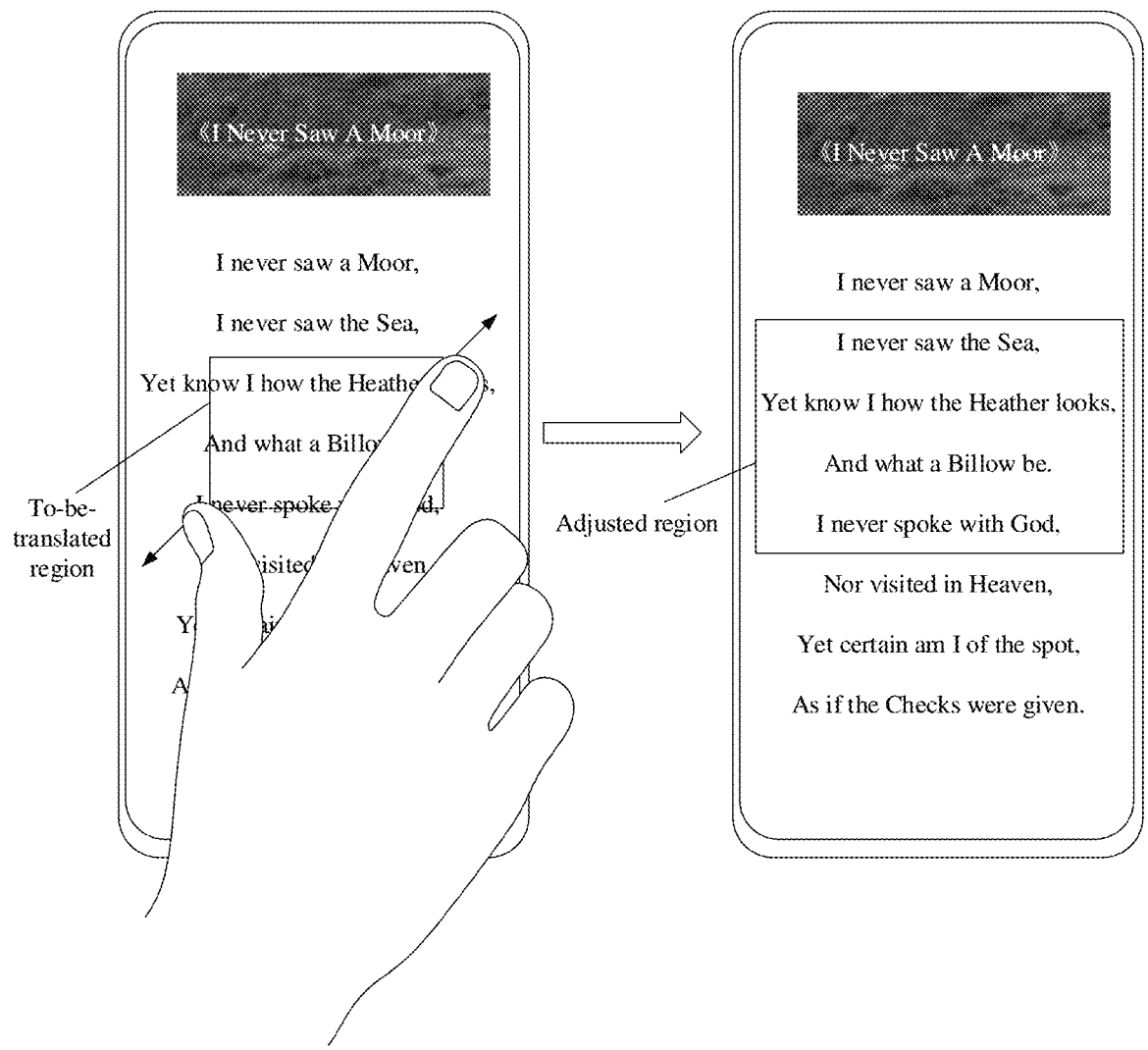
FIG. 8 is an example diagram of an electronic device obtaining an adjusted region by adjusting a to-be-translated region according to an embodiment of the present disclosure.
Figure 9:
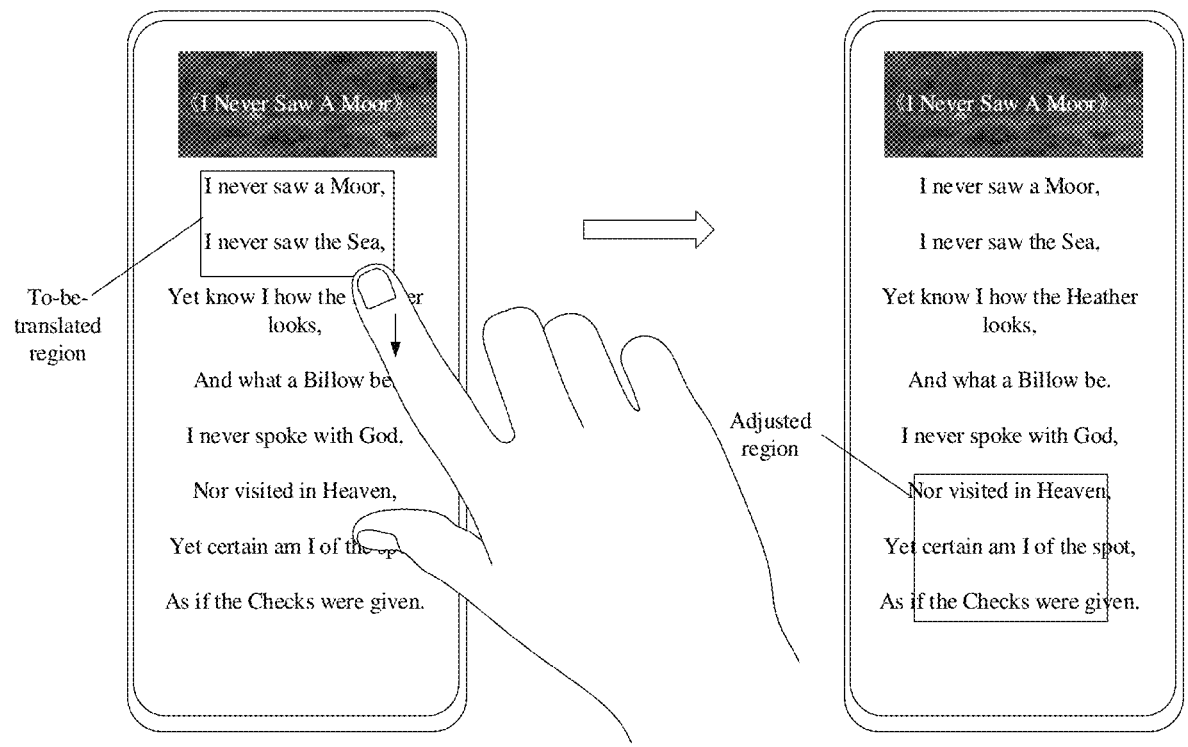
FIG. 9 is another example diagram of an electronic device obtaining an adjusted region by adjusting a to-be-translated region according to an embodiment of the present disclosure.

Exemplarily, the electronic device displays a rectangular frame representing the to-be-translated region on the screen. As illustrated in FIG. 8, when the user slides diagonal positions of the to-be-translated region in opposite directions, the electronic device receives the region adjustment operation for instructing to amplify the to-be-translated region, and correspondingly amplifies the size of the to-be-translated region to obtain the adjusted region. As illustrated in FIG. 9, when the user drags the to-be-translated region with his finger, the electronic device receives a region adjustment operation for instructing to adjust a position of the to-be-translated region, and correspondingly adjusts the position of the to-be-translated region to obtain the adjusted region.

Optionally, in an embodiment, the content display method further includes, subsequent to determining the to-be-translated region of the screen: identifying a gaze region of a user on the screen when determination of the to-be-translated region fails; and determining the to-be-translated region based on the gaze region.

It can be understood that a case where determining the to-be-translated region fails may occur in practice. For example, the electronic device may not be configured with the predetermined translation region, and no predetermined translation region can be obtained as the to-be-translated region. In such a case, another optional region determination strategy is provided in the embodiment of the present disclosure.

It should be noted that when viewing the page content of the screen, the user may only gaze at a specific region in the page content. A content within and around the specific region is clear for the user, but other regions away from the specific region are blurry for the user. Therefore, when the electronic device fails to obtain the predetermined translation region, the gaze region of the user on the screen is identified by using an eyeball tracking technology. The specific kind of eyeball tracking technology used for identifying the gaze region of the user on the screen is not specifically limited herein, and may be configured by a person skilled in the art as actually needed.

As above, after identifying the user's gaze region on the screen, the electronic device may determine the to-be-translated region according to the gaze region.

As an optional implementation, the electronic device directly determines the gaze region as the to-be-translated region.

As another optional implementation, the electronic device scales the gaze region to obtain a gaze scaling region and identifies the gaze scaling region as the to-be-translated region.

Exemplarily, the electronic device is configured with a predetermined scaling multiple (the predetermined scaling multiple may be configured by a person skilled in the art as actually needed, which may be configured as a positive number smaller than 1 or greater than 1). When the predetermined scaling multiple is the positive number smaller than 1, the electronic device obtains the gaze scaling region by scaling the gaze region down based on the predetermined scaling multiple, and determines the gaze scaling region as the to-be-translated region. When the predetermined scaling multiple is the positive number greater than 1, the electronic device obtains the gaze scaling region by scaling the gaze region up based on the predetermined scaling multiple, and determines the gaze scaling region as the to-be-translated region.

In addition, the electronic device may also dynamically determine a scaling multiple for the gaze region.

Here, the electronic device obtains a gaze intensity of the user, and determines a scaling multiple corresponding to the obtained gaze intensity based on a predetermined correspondence between gaze intensities and scaling multiples, the scaling multiple being referred to as a target scaling multiple. Correspondingly the electronic device scales the gaze region based on the target scaling multiple, thereby obtaining a gaze scaling region. The configuration of the predetermined correspondence between the gaze intensities and the scaling multiples is not specifically limited herein, and may be configured by a person skilled in the art as actually needed. For example, a negative correlation between the scaling multiple and the gaze intensity may be configured.

Optionally, in an embodiment, the operation of obtaining the screen state of the electronic device includes: monitoring an action_down event, an action_move event, or an action_up event for the screen; and determining that the screen state is the touched state when the action_move event or the action_down event is monitored; or determining that the screen state is the non-touch state when the action_up event is monitored.

In the embodiment of the present disclosure, taking the Android System as an example, an optional screen state obtaining mode is further provided.

Here, the electronic device may monitor the action_down event, the action_move event, or the action_up event for the screen through a ScreenTouchListener interface provided by the framework layer of the Android system. In response to monitoring the action_down event, it indicates that the touch starts, and the screen state is determined to be the touched state at this time. In response to monitoring the action_move event, it indicates that a touch position is moved during touch, and the screen state is determined to be the touched state at this time. In response to monitoring the action_up event, it indicates that the touch ends, and the screen state is determined to be the non-touch state at this time.

Figure 10:
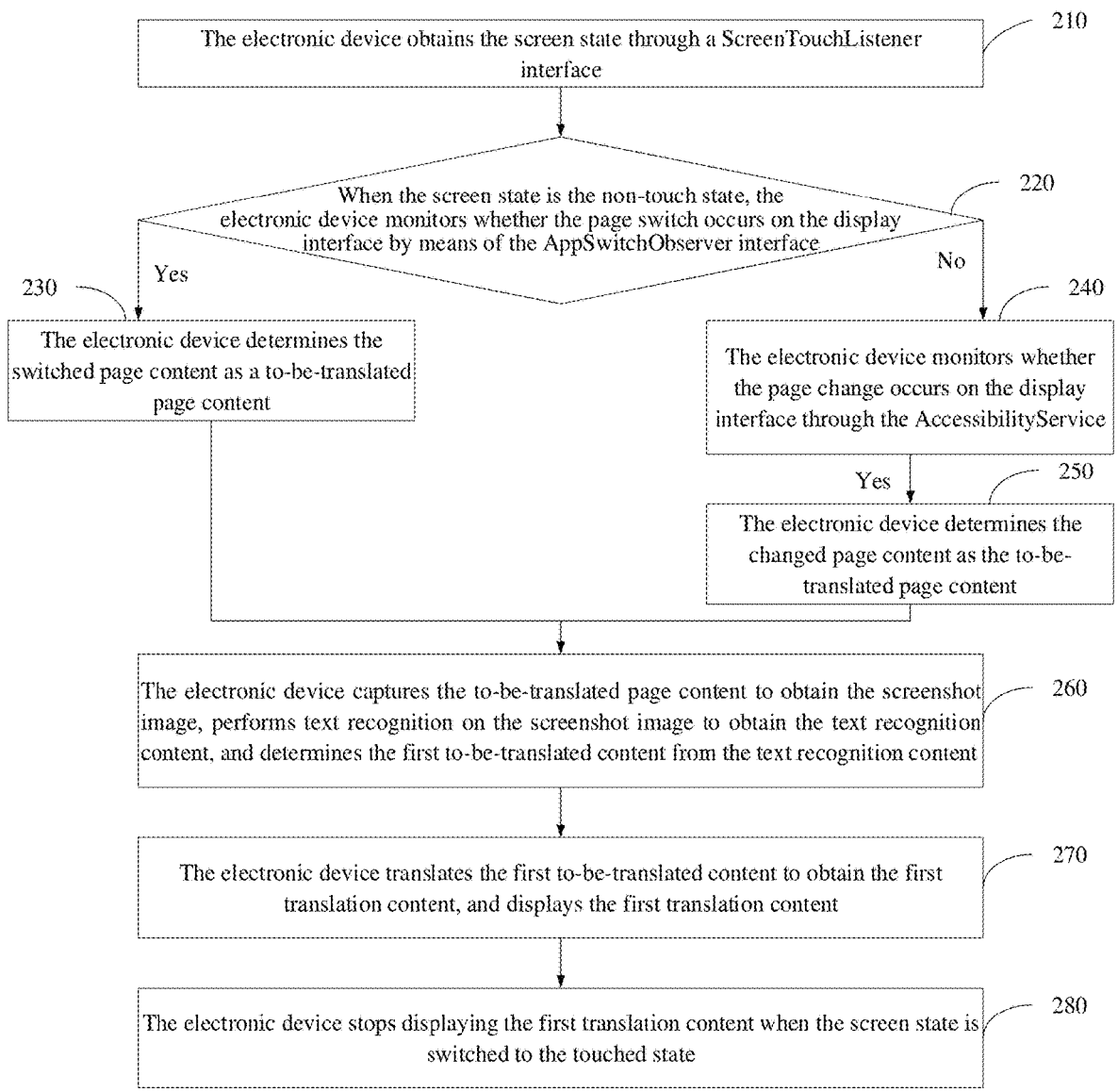
FIG. 10 is another flowchart illustrating a content display method according to an embodiment of the present disclosure.

The following describes the content display method provided by the present disclosure by taking the Android system being used by electronic device as an example. Referring to FIG. 10, a process of the content display method according to this embodiment of the present disclosure may include the following operations.

At 210, the electronic device obtains the screen state through a ScreenTouchListener interface.

Here, the screen state includes the touched state and the non-touch state. For example, the touched state is the state when the user touches the screen of the electronic device by using the body part like the finger or the touch device like the stylus pen. The non-touch state is the state when the screen of the electronic device is not touched by the body part of the user or the touch device.

For example, when the translation function is started, the electronic device may obtain its own screen state, and then perform translation processing based on the obtained screen state.

Exemplarily, referring to FIG. 2, the electronic device provides the translation control for starting and closing the translation function. As illustrated in FIG. 2, the translation control may be disposed in the drop-down box of the electronic device or disposed in the sidebar and other function menus of the electronic device, which may be specifically configured by a person skilled in the art as actually needed.

Here, the electronic device may monitor the action_down event, the action_move event, or the action_up event for the screen through the ScreenTouchListener interface provided by the framework layer of the Android system. In response to monitoring the action_down event, it indicates that the touch starts, and the screen state is determined to be the touched state at this time. In response to monitoring the action_move event, it indicates that a touch position is moved during touch, and the screen state is determined to be the touched state at this time. In response to monitoring the action_up event, it indicates that the touch ends, and the screen state is determined to be the non-touch state at this time.

At 220, when the screen state is the non-touch state, the electronic device monitors whether the page switch occurs on the display interface by means of the AppSwitchObserver interface. In response to that the page switch occurs on the display interface, the action at 230 is performed; otherwise, the action at 240 is performed.

As above, the two screen states are defined in the embodiments of the present disclosure, which are the touched state and the non-touch state, respectively.

It can be understood that, in practice, the page of the electronic device generally provides the control for page switching, like the "forward" control, the "backward" control, the "previous-page" control, and the "next-page" control. After the page switch control is touched by the user (that may be touched directly by the user's finger or indirectly by the user through the touch device like the stylus pen), a new page may take some time to complete loading. If the page content displayed on the display interface is translated as soon as the user ends touching, the page content displayed on the interface may still be in a process of switching or loading. In this case, the content expected to be translated by the user cannot be translated. Therefore, the translated content is incomplete and low in accuracy.

Therefore, in the embodiments of the present disclosure, in addition to monitoring the touch state of the screen, whether the page switch occurs is monitored by using the "AppSwitchObserver" interface provided by the frame layer of the Android system. In response to that the page switch occurs on the display interface, the action at 230 is performed; otherwise, the action at 240 is performed.

At 230, the electronic device determines the switched page content as a to-be-translated page content, and the action at 260 is performed.

At 240, the electronic device monitors whether the page change occurs on the display interface through the AccessibilityService. When the page change occurs on the display interface, the action at 250 is performed.

It can be understood that, in practice, in addition to providing the control for the page switch, the page of the electronic device further provides the control or touch operation for controlling the page itself such as the "refresh" control for refreshing the page content, the "maximization" control for maximizing the page, the "restoring-downward" control for restoring the page downwards, the "slider" control for sliding the page, and the sliding operation for sliding the page. When the control that may cause the change of the page itself is touched by the user (that may be touched directly by the user's finger or indirectly by the user through the touch device like the stylus pen) or when the touch operation is performed by the user based on the screen, a new page may take some time to complete loading. For example, when when the user's finger leaves the screen after sliding the "slider" control in the page with his finger or performing the screen-based sliding operation for sliding the image, the screen state is the non-touch state, but the page displayed on the display interface continues to slide by inertia. If translation is performed as soon as the user ends touching, the page may still possibly be changing. In this case, the content expected to be translated by the user cannot be translated. Therefore, in the embodiments of the present disclosure, the electronic device monitors whether the page change occurs by using the AccessibilityService provided by the Android system. In response to that the page change occurs, the action at 250 is performed; otherwise, the page content of the display interface is directly determined as the to-be-translated page content.

At 250, the electronic device determines the changed page content as the to-be-translated page content, and the action at 260 is performed.

At 260, the electronic device captures the to-be-translated page content to obtain the screenshot image, performs text recognition on the screenshot image to obtain the text recognition content, and determines the first to-be-translated content from the text recognition content.

As above, after the to-be-translated page content is determined, the electronic device captures the to-be-translated page content to obtain the screenshot image corresponding to the to-be-translated page content. It can be understood that the screenshot image may include contents such as text, symbols, numerical codes, and pictures.

As above, after the screenshot image corresponding to the to-be-translated page content is captured and obtained, the electronic device performs text recognition on the screenshot image to correspondingly obtain the text recognition content corresponding to the screenshot image. The specific kind of the text recognition technology used by the electronic device is not specifically limited herein and may be configured by a person skilled in the art as actually needed. For example, the electronic device may perform text recognition on the screenshot image by using the OCR technology, to obtain the text recognition content corresponding to the screenshot image. It should be noted that the text recognition content includes, but is not limited to, text contents such as text, symbols, and numerical codes.

After the text recognition content is identified, the electronic device may determine the first to-be-translated content from the text recognition content based on the configured content determination strategy.

It should be noted that translation means expressing the meaning of speech or writing in a different language (also means changing expression between the dialect and the common national language, between dialects, and between the ancient language and the modern language); or expressing the symbol or numerical code representing speech or writing in the speech or writing. Correspondingly, in the embodiments of the present disclosure, the first to-be-translated content may be a writing content/characters or other contents capable of characterizing a language like a symbol or a numerical code.

In addition, in the embodiments of the present disclosure, the configuration for the content determination strategy is not specifically limited, and may be set by a person skilled in the art as actually needed. For example, the configuration for the content determination strategy may include: determining the characters of the predetermined linguistic type as the first to-be-translated content.

Here, the predetermined linguistic type may be constant or dynamic. For example, the predetermined linguistic type may configured by default to English or Chinese, etc. by the electronic device. Moreover, the predetermined linguistic type may also be dynamically configured by the electronic device based on the user's viewing of the page content.

At 270, the electronic device translates the first to-be-translated content to obtain the first translation content, and displays the first translation content.

After the first to-be-translated content is determined, the electronic device further translates the first to-be-translated content based on the configured translation strategy. The translated content is referred to as the first translation content. The translation strategy is used to describe how to translate the first to-be-translated content, which may be specifically configured by a person skilled in the art as actually needed.

As above, after the first translation content is obtained by translating the first to-be-translated content, the electronic device further displays the first translation content for user's view. It should be noted that the display mode of the first translation content is not specifically limited in the embodiments of the present disclosure and may be configured by a person skilled in the art as actually needed. Exemplarily, the first translation content may be displayed covering the first to-be-translated content. For example, the translation image with the same size as the display interface may be generated by rendering based on the first translation content and be displayed in the display interface, enabling the translation image to cover the original page content. In addition, the first translation content and the first to-be-translated content may be displayed simultaneously.

For example, referring to FIG. 3, the electronic device determines the English poem I Never Saw A Moor displayed in its display interface as the first to-be-translated content, translates it from English to Chinese to obtain the first translation content as the corresponding Chinese text, and displays this Chinese text (i.e. the first translation content) in the display interface. As illustrated in FIG. 3, it can be seen that both English characters in the image and in text form are translated into the corresponding Chinese characters for display.

For another example, referring to FIG. 4, a passage of Morse code in the display interface " . . . " is determined as the first to-be-translated content. The electronic device translates it cryptographically to obtain the first translation content including the corresponding English text "HI".

At 280, the electronic device stops displaying the first translation content when the screen state is switched to the touched state.

In the embodiment of the present disclosure, during the display of the first translation content, the electronic device also monitors the change in the screen state in real time. In response to monitoring that the screen is switched to the touched state from the non-touch state, the electronic device stops displaying the first translation content. When the electronic device displays the first translation content in the manner of covering the first to-be-translated content, the display of the first to-be-translated content is recovered after the first translation content stops displaying. When the electronic device adopts the manner of simultaneously displaying the first to-be-translated content and the first translation content, the electronic device only displays the page content of the page where the first to-be-translated content is located after the first translation content stops displaying.

Figure 11:
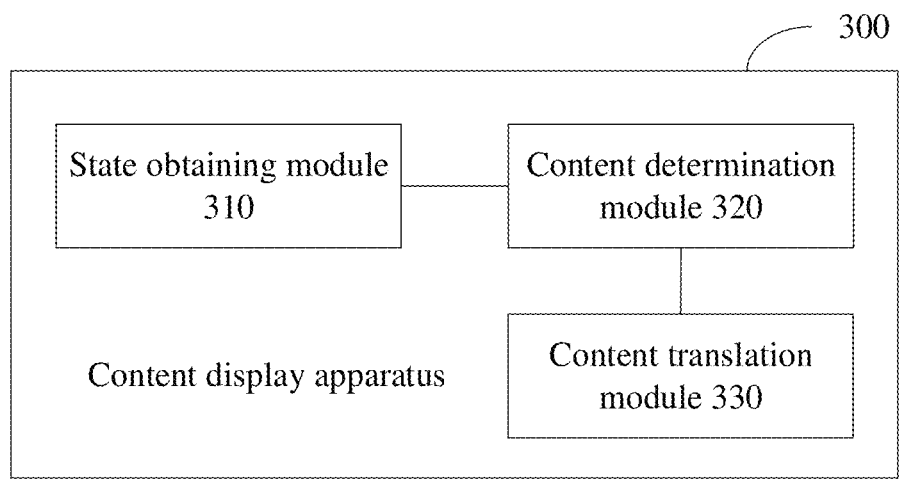
FIG. 11 is a schematic structural diagram of a content display apparatus according to an embodiment of the present disclosure.

FIG. 11 is a schematic structural diagram of a content display apparatus 300 according to an embodiment of the present disclosure. The content display apparatus 300 is applied in the electronic device provided by the present disclosure. As illustrated in FIG. 11, the content display apparatus 300 may include: a state obtaining module 310 configured to obtain a screen state of the electronic device; a content determination module 320 configured to determine a first to-be-translated content in a display interface when the screen state is a non-touch state; and a content translation module 330 configured to translate the first to-be-translated content to obtain a first translation content, and display the first translation content, and to stop displaying the first translation content when the screen state is switched to a touched state.

Optionally, in an embodiment, the content determination module 320, when determining the first to-be-translated content in the display interface when the screen state is the non-touch state, is configured to: determine, when the screen state is the non-touch state and a page switch occurs on the display interface, the first to-be-translated content from a page content after the switch.

Optionally, in an embodiment, the content determination module 320, when determining the first to-be-translated content in the display interface when the screen state is the non-touch state, is configured to: determine, when the screen state is the non-touch state and a page change occurs on the display interface, the first to-be-translated content from a page content after the change.

Optionally, in an embodiment, the page change includes at least one of a size change, a content change, and a sliding change of the page.

Optionally, in an embodiment, the content display apparatus provided by the present disclosure further includes a display control module configured to, subsequent to stopping displaying the first translation content: obtain a touch operation in the touched state; and when the touch operation is a sliding operation, slide and display, on the display interface in response to the sliding operation, a page content of a page where the first to-be-translated content is located.

Optionally, in an embodiment, the content determination module 320 is further configured to, subsequent to sliding and displaying, on the display interface, the page content of the page where the first to-be-translated content is located: determine a second to-be-translated content in the display interface when the screen state is switched to the non-touch state, wherein the second to-be-translated content is a to-be-translated content in a page content after sliding the page where the first to-be-translated content is located; and translate the second to-be-translated content to obtain a second translation content, and displaying the second translation content.

Optionally, in an embodiment, the content translation module 330, when translating the second to-be-translated content to obtain the second translation content, is configured to: obtain a difference content between the second to-be-translated content and the first to-be-translated content; translate the difference content to obtain a third translation content, and obtaining a fourth translation content corresponding to a same content between the second to-be-translated content and the first to-be-translated content from the first translation content; and obtain the second translation content based on the third translation content and the fourth translation content.

Optionally, in an embodiment, the content determination module 320, when determining the first to-be-translated content in the display interface, is configured to: capture a page content currently displayed on the display interface to obtain a screenshot image; perform text recognition on the screenshot image to obtain a text recognition content; and determine the first to-be-translated content from the text recognition content.

Optionally, in an embodiment, the content translation module 330, when displaying the first translation content, is configured to: render the first translation content to a position corresponding to the first to-be-translated content in the screenshot image to obtain a translation image; and display the translation image in the display interface.

Optionally, in an embodiment, the content translation module 330, when rendering the first translation content to the position corresponding to the first to-be-translated content in the screenshot image, is configured to: obtain a display parameter of the first to-be-translated content, and determine a target display parameter for the first translation content based on the display parameter; and render the first translation content to the position corresponding to the first to-be-translated content in the screenshot image based on the target display parameter.

Optionally, in an embodiment, the content determination module 320 is configured to, prior to capturing the page content currently displayed on the display interface to obtain the screenshot image: identify whether the page content currently displayed on the display interface is a text content; and capture the page content currently displayed on the display interface to obtain the screenshot image when the page content currently displayed on the display interface is not the text content.

Optionally, in an embodiment, the content determination module 320 is further configured to, subsequent to identifying whether the page content currently displayed on the display interface is the text content: determine the first to-be-translated content directly from the currently displayed page content when the page content currently displayed on the display interface is the text content.

Optionally, in an embodiment, the content determination module 320, when determining the first to-be-translated content in the display interface, is configured to: determine a to-be-translated region of a screen; and determine the first to-be-translated content from the to-be-translated region.

Optionally, in an embodiment, the content determination module 320, when determining the to-be-translated region of the screen, is configured to: obtain a predetermined translation region for the screen, and determine the predetermined translation region as the to-be-translated region.

Optionally, in an embodiment, the content determination module 320, when determining the first to-be-translated content from the to-be-translated region, is configured to: receive a region adjustment operation for the to-be-translated region; adjust the to-be-translated region based on the region adjustment operation to obtain an adjusted region; and determine the first to-be-translated content from the adjusted region.

Optionally, in an embodiment, the content determination module 320 is further configured to, subsequent to determining the to-be-translated region of the screen: identify a gaze region of a user on the screen when determination of the to-be-translated region fails; and determine the to-be-translated region based on the gaze region.

Optionally, in an embodiment, the state obtaining module 310, when obtaining the screen state of the electronic device, is configured to: monitor an action_down event, an action_move event, or an action_up event for the screen; and determine that the screen state is the touched state when the action_move event or the action_down event is monitored; or determine that the screen state is the non-touch state when the action_up event is monitored.

It should be noted that the content display apparatus provided by the embodiments of the present disclosure is of the same concept as the content display method adapted for the electronic device according to the above embodiments, a specific implementation of which can refer to the content display method embodiments and will be omitted herein.

Embodiments of the present disclosure provide a storage medium having a computer program stored thereon. The computer program, when executed on a processor of an electronic device according to the embodiments of the present disclosure, enables the processor of the electronic device to perform steps of any content display method adapted for the electronic device as described above. The storage medium may be a magnetic disk, an optical disc, a Read Only Memory (ROM), or a Random Access Memory (RAM), etc.

Figure 12:
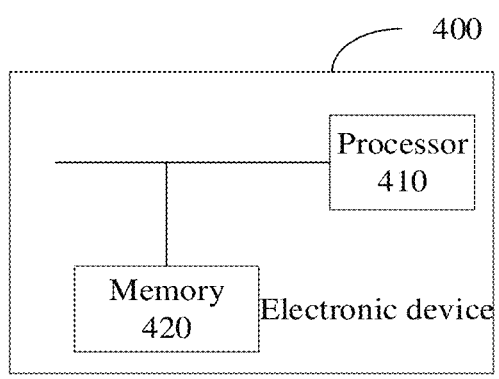
FIG. 12 is a schematic structural diagram of an electronic device according to an embodiment of the present disclosure.

The present disclosure further provides an electronic device. Referring to FIG. 12, an electronic device 400 includes a processor 410 and a memory 420.

The processor 410 in this embodiment of the present disclosure may be a general-purpose processor, such as a processor of an ARM architecture.

The memory 420 stores a computer program and may be a high speed random access memory and a non-volatile memory, such as at least one disk storage device, a flash memory, or other volatile solid state memory. Accordingly, the memory 420 may further include a memory controller to provide access to the memory 420 by the processor 401. The processor 410 performs any one of the above content display methods adapted for the electronic device by executing the computer program in the memory 420. The method, for example, includes: obtaining a screen state of the electronic device; determining a first to-be-translated content in a display interface when the screen state is a non-touch state; translating the first to-be-translated content to obtain a first translation content, and displaying the first translation content; and stopping displaying the first translation content when the screen state is switched to a touched state.

The content display method and apparatus, the storage medium, and the electronic device according to the embodiments of the present disclosure are described in detail above. Specific embodiments are used in the present disclosure to illustrate the principles and implementations of the present disclosure. The description of the above embodiments is only intended to facilitate understanding of the method and its core concepts. Meanwhile, those skilled in the art can make modifications to specific implementations and change an application scope based on the concepts of the present disclosure. In summary, the contents of the specification shall not be construed as limitations of the present disclosure.

What is claimed is:

1. A content display method, applied in an electronic device, the method comprising:
   obtaining a screen state of the electronic device;
   determining a first to-be-translated content in a display interface in response to the screen state being a non-touch state;
   translating the first to-be-translated content to obtain a first translation content, and displaying the first translation content; and
   stopping displaying the first translation content in response to the screen state being switched to a touched state;
   wherein the method further comprises, subsequent to said stopping displaying the first translation content:
   obtaining a touch operation in the touched state; and
   in response to the touch operation being a sliding operation, sliding and displaying, on the display interface, a page content of a page where the first to-be-translated content is located;
   determining a second to-be-translated content in the display interface in response to the screen state being switched to the non-touch state, wherein the second to-be-translated content is a to-be-translated content in a page content after sliding the page where the first to-be-translated content is located; and
   translating the second to-be-translated content to obtain a second translation content, comprising:
   obtaining a difference content between the second to-be-translated content and the first to-be-translated content;
   translating the difference content to obtain a third translation content, and obtaining, from the first translation content, a fourth translation content corresponding to a same content between the second to-be-translated content and the first to-be-translated content; and obtaining the second translation content based on the third translation content and the fourth translation content; and displaying the second translation content.

2. The content display method according to claim 1, wherein said determining the first to-be-translated content in the display interface in response to the screen state being the non-touch state comprises:

determining, in response to the screen state being the non-touch state and a page switch occurring on the display interface, the first to-be-translated content from a page content after the page switch.

3. The content display method according to claim 1, wherein said determining the first to-be-translated content in the display interface in response to the screen state being the non-touch state comprises:

determining, in response to the screen state being the non-touch state and a page change occurring on the display interface, the first to-be-translated content from a page content after the page change.

4. The content display method according to claim 3, wherein the page change comprises at least one of a size change, a content change, and a sliding change of the page.

5. The content display method according to claim 1, wherein said determining the first to-be-translated content in the display interface comprises:

capturing a page content currently displayed on the display interface to obtain a screenshot image;

performing text recognition on the screenshot image to obtain a text recognition content; and determining the first to-be-translated content from the text recognition content.

6. The content display method according to claim 5, wherein said displaying the first translation content comprises:

rendering the first translation content to a position corresponding to the first to-be-translated content in the screenshot image to obtain a translation image; and displaying the translation image in the display interface.

7. The content display method according to claim 6, wherein said rendering the first translation content to the position corresponding to the first to-be-translated content in the screenshot image comprises:

obtaining a display parameter of the first to-be-translated content, and determining a target display parameter for the first translation content based on the display parameter; and rendering the first translation content to the position corresponding to the first to-be-translated content in the screenshot image based on the target display parameter.

8. The content display method according to claim 5, wherein said capturing the page content currently displayed on the display interface to obtain the screenshot image comprises:

identifying whether the page content currently displayed on the display interface is a text content; and capturing the page content currently displayed on the display interface to obtain the screenshot image, in response to the page content currently displayed on the display interface being not the text content.

9. The content display method according to claim 8, further comprising, subsequent to said identifying whether the page content currently displayed on the display interface is the text content:

determining the first to-be-translated content directly from the page content currently displayed on the display interface, in response to the page content currently displayed on the display interface being the text content.

10. The content display method according to claim 1, wherein said determining the first to-be-translated content in the display interface comprises:

determining a to-be-translated region of a screen; and determining the first to-be-translated content from the to-be-translated region.

11. The content display method according to claim 10, wherein said determining the to-be-translated region of the screen comprises:

obtaining a predetermined translation region for the screen, and determining the predetermined translation region as the to-be-translated region.

12. The content display method according to claim 10, wherein said determining the first to-be-translated content from the to-be-translated region comprises:

receiving a region adjustment operation for the to-be-translated region;

adjusting the to-be-translated region based on the region adjustment operation to obtain an adjusted region; and determining the first to-be-translated content from the adjusted region.

13. The content display method according to claim 11, further comprising:

identifying a gaze region of a user on the screen, in response to determination of the to-be-translated region based on the predetermined translation region failing; and determining the to-be-translated region based on the gaze region.

14. The content display method according to claim 1, wherein said obtaining the screen state of the electronic device comprises:

monitoring an action_down event, an action_move event, or an action_up event for the screen; and determining that the screen state is the touched state in response to the action_move event or the action_down event being monitored; or determining that the screen state is the non-touch state in response to the action_up event being monitored.

15. A non-transitory storage medium, having a computer program stored thereon, wherein the computer program, when loaded by a processor of an electronic device, performs a content display method comprising:

obtaining a screen state of the electronic device;

determining a first to-be-translated content in a display interface in response to the screen state being a non-touch state;

translating the first to-be-translated content to obtain a first translation content, and displaying the first translation content; and stopping displaying the first translation content in response to the screen state being switched to a touched state;

wherein said determining the first to-be-translated content in the display interface comprises:

identifying whether a page content currently displayed on the display interface is a text content;

capturing the page content currently displayed on the display interface to obtain a screenshot image, in response to the page content currently displayed on the display interface being not the text content;

performing text recognition on the screenshot image to obtain a text recognition content; and determining the first to-be-translated content from the text recognition content.

16. An electronic device, comprising a processor and a memory storing a computer program, wherein the processor, when loading the computer program, performs a content display method comprising:
obtaining a screen state of the electronic device;
determining a first to-be-translated content in a display interface in response to the screen state being a non-touch state;
translating the first to-be-translated content to obtain a first translation content, and displaying the first translation content; and
stopping displaying the first translation content in response to the screen state being switched to a touched state;
wherein said determining the first to-be-translated content in the display interface comprises:
determining a to-be-translated region of a screen based on a predetermined translation region for the screen; and
determining the first to-be-translated content from the to-be-translated region; and
wherein the method further comprises, subsequent to said determining the to-be-translated region of the screen based on the predetermined translation region:
identifying a gaze region of a user on the screen, in response to determination of the to-be-translated region based on the predetermined translation region failing; and
determining the to-be-translated region based on the gaze region.

17. The non-transitory storage medium according to claim 15, wherein the method further comprises, subsequent to said stopping displaying the first translation content:
obtaining a touch operation in the touched state;
in response to the touch operation being a sliding operation, sliding and displaying, on the display interface, a page content of a page where the first to-be-translated content is located;
determining a second to-be-translated content in the display interface in response to the screen state being switched to the non-touch state, wherein the second to-be-translated content is a to-be-translated content in a page content after sliding the page where the first to-be-translated content is located;
obtaining a difference content between the second to-be-translated content and the first to-be-translated content;
translating the difference content to obtain a third translation content, and obtaining, from the first translation content, a fourth translation content corresponding to a same content between the second to-be-translated content and the first to-be-translated content;
obtaining a second translation content for the second to-be-translated content, based on the third translation content and the fourth translation content; and
displaying the second translation content.

18. The non-transitory storage medium according to claim 15, wherein said determining the first to-be-translated content in the display interface comprises:
determining a to-be-translated region of a screen, based on a predetermined translation region for the screen; and
determining the first to-be-translated content from the to-be-translated region; and
wherein the method further comprises, subsequent to said determining the to-be-translated region of the screen based on a predetermined translation region:
identifying a gaze region of a user on the screen, in response to determination of the to-be-translated region based on a predetermined translation region failing; and
determining the to-be-translated region based on the gaze region.

19. The electronic device according to claim 16, wherein the method further comprises, subsequent to said stopping displaying the first translation content:
obtaining a touch operation in the touched state;
in response to the touch operation being a sliding operation, sliding and displaying, on the display interface, a page content of a page where the first to-be-translated content is located;
determining a second to-be-translated content in the display interface in response to the screen state being switched to the non-touch state, wherein the second to-be-translated content is a to-be-translated content in a page content after sliding the page where the first to-be-translated content is located;
obtaining a difference content between the second to-be-translated content and the first to-be-translated content;
translating the difference content to obtain a third translation content, and obtaining, from the first translation content, a fourth translation content corresponding to a same content between the second to-be-translated content and the first to-be-translated content;
obtaining the second translation content for the second to-be-translated content, based on the third translation content and the fourth translation content; and
displaying the second translation content.

20. The electronic device according to claim 16, wherein said determining the first to-be-translated content in the display interface comprises:
identifying whether a page content currently displayed on the display interface is a text content;
capturing the page content currently displayed on the display interface to obtain a screenshot image, in response to the page content currently displayed on the display interface being not the text content;
performing text recognition on the screenshot image to obtain a text recognition content; and
determining the first to-be-translated content from the text recognition content.

* * * * *